Sept. 25, 1962     A. Y. DODGE     3,055,232
TRANSMISSION
Filed Dec. 19, 1960                              2 Sheets-Sheet 1
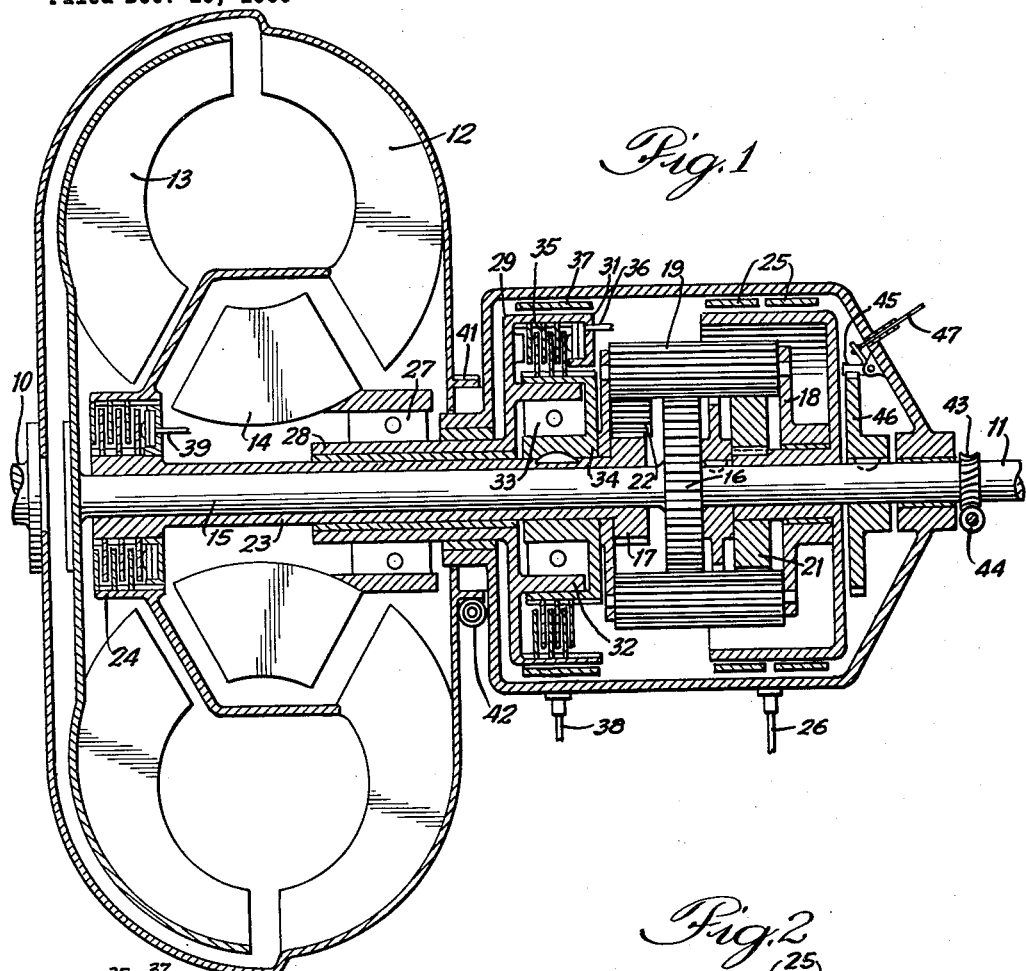
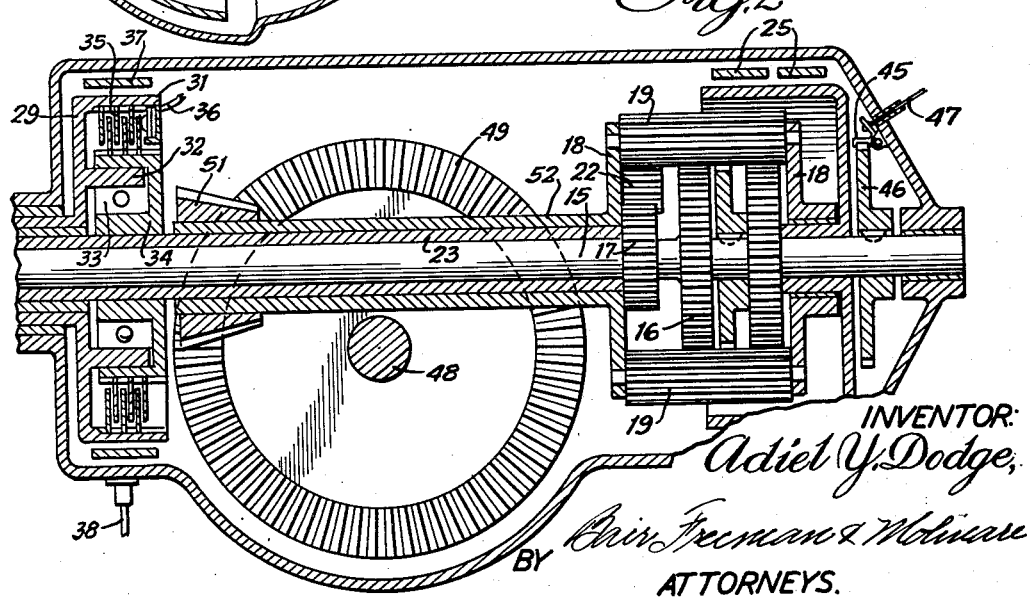
INVENTOR:
Adiel Y. Dodge,
BY Shir, Freeman & Molinare
ATTORNEYS.

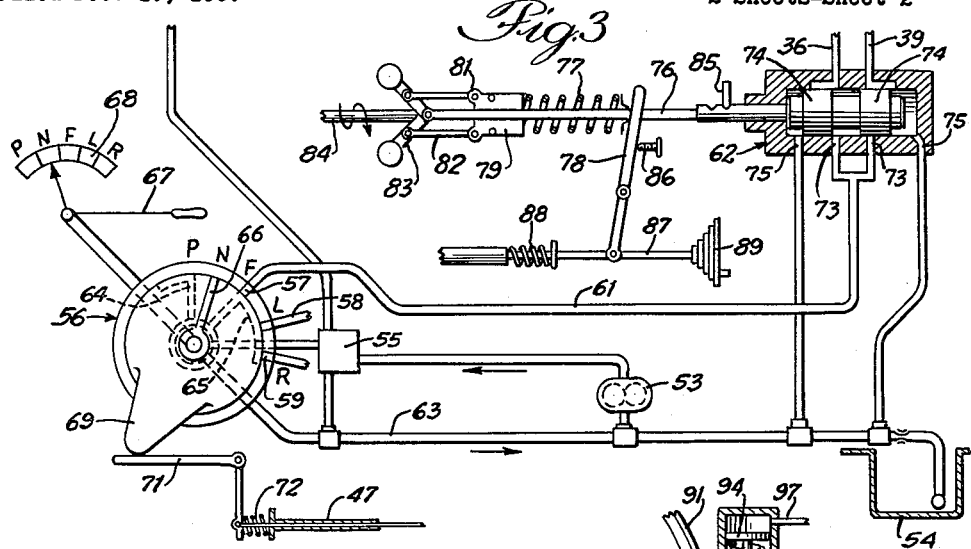

United States Patent Office 3,055,232
Patented Sept. 25, 1962

3,055,232
TRANSMISSION
Adiel Y. Dodge, % A. Y. Dodge Company,
206 S. Main St., Rockford, Ill.
Filed Dec. 19, 1960, Ser. No. 76,687
8 Claims. (Cl. 74—677)

This invention relates to transmissions and more particularly to a hydraulic and mechanical transmission suitable for automotive use and to controls therefor.

Transmissions as heretofore constructed for use on automobiles have tended to become extremely complex in order to achieve the desired flexibility and efficiency of performance. Automatic controls for such transmissions also tend to become highly complex, involving complicated control valves for supplying operating fluid to operating mechanisms for the various parts of the transmission, as well as complicated mechanisms for operating the valves.

It is one of the objects of the present invention to provide a transmission which is relatively simple and inexpensive to manufacture and which functions efficiently through a wide range of operating conditions.

Another object is to provide a transmission having two infinitely variable operating ranges together with simple and easily controllable means to effect shifting from one range to the other.

A further object is to provide a transmission which is easily and simply controlled through a manually operable selector valve and a single automatically shiftable valve.

According to a feature of the invention, the automatically shiftable valve operates in response to combined effects of speed and torque to effect shifting of the transmission from a low to a high range and conversely in a simple and positive manner.

The above and other objects and features of the invention will be more readily apparent from the following description when read in connection with the accompanying drawings, in which:

FIGURE 1 is an axial section through a transmission embodying the invention;

FIGURE 2 is a partial view similar to FIGURE 1 showing an arrangement of the transmission for mounting on a transverse axle;

FIGURE 3 is a diagrammatic view of a control system for the transmission;

FIGURES 4 and 5 are detailed views of alternative operating means for the transmission, clutches and brakes; and FIGURE 6 is a diagrammatic view showing an alternative pumping arrangement for supplying operating fluid to the transmission.

The transmission, as shown in FIGURE 1, is adapted to connect a driving shaft 10 which may be the crankshaft of an engine or an extension thereof to a driven shaft 11 which is adapted to be connected through the usual differential gear to the driving wheels of an automobile. The driving shaft is connected to and drives the vaned driving member 12 of a hydraulic torque converter which also includes a vaned driven member 13 and a vaned stator or reaction member 14. It will be understood that the hydraulic torque converter is filled with a suitable liquid which is propelled through the driven member and stator by rotation of the driving member in the usual manner to produce a driving torque.

The driven member 13 is secured to a shaft 15 to which a sun gear 16 is permanently connected. The sun gear forms a part of a differential gear set including a second sun gear 17 and a gear carrier 18. Elongated planet pinions 19 mounted on a gear carrier mesh directly with the sun gear 16 and with a third reaction sun gear 21 of the same size as the sun gear 16. Intermediate pinions 22 on the carrier mesh with the pinions 19 and with the sun gear 17.

The sun gear 17 is secured to a sleeve shaft 23 surrounding the shaft 15 and which may be connected through a clutch 24 to the driving element 12 of the hydraulic torque converter. The planet carrier 18 is permanently connected to the driven shaft 11, as shown. The sun gear 21 may be held against rotation by a brake 25 which, as shown in FIGURE 1, is normally disengaged and is engaged by fluid pressure operated actuating means supplied with actuating fluid through a connection 26.

The reaction element 14 is connected through a one-way clutch 27 to a sleeve 28 rotatable on the sleeve shaft 23. The sleeve shaft 28 is secured to a flange member 29 formed with radially spaced, axially extending flanges 31 and 32. The flange 32 is connected through a one-way clutch 33 with the sleeve shaft 23 through the intermediary of a double flange annular ring 34 keyed to the sleeve shaft. The outer flange 31 may be connected to the sleeve shaft 23 through a friction clutch 35 connecting the outer flange 31 to the outer flange of the ring 34. The clutch 35 is normally disengaged and may be engaged by hydraulic pressure supplied thereto through a conduit 36. It will be understood that in the case of the conduit 36 and other conduits described hereinafter which connect to rotating parts, suitable slip joints are provided as shown, for example, in my Patent No. 2,860,526. Additionally, a brake 37 engaged by hydraulic pressure supplied through a connection 38 may hold the member 29 and the sleeve 28 stationary when desired. The clutch 24 may similarly be engaged by fluid supplied through a conduit 39.

The casing for the driving element 12 of the hydraulic torque converter may terminate in an annular gear 41 driving a gear 42 which may be utilized to drive a pump for supplying operating fluid. Similarly, the driven shaft 11 may carry a gear 43 driving a gear 44 which may be utilized as a speedometer drive and in some cases to drive a further fluid pump.

When the transmission is in neutral, all the clutches and brakes are disengaged so that the parts can turn freely relative to each other without transmitting any torque from the driving shaft to the driven shaft. For low gear drive the brake 37 and the clutch 35 are engaged to hold the sun gear 17 against rotation so that it may function as a mechanical reaction member in the gear set. At the same time the one-way brake 27 reacting against the sleeve 28 will hold the reaction member 14 against reverse rotation to provide a reaction member in the hydraulic torque converter. At this time, torque is transmitted from the driving shaft to the driven shaft through the torque converter and the gear set in series so that maximum output torque is provided.

For high speed range the clutch 24 is engaged, the brake 37 remains engaged and the clutch 35 is disengaged. At this time a split torque arrangement is provided, a portion of the torque being transmitted mechanically from the driving shaft through the clutch 24 to the sun gear 17 and another part of the torque being transmitted through the hydraulic torque converter to the sun gear 16, as in the low range condition. At this time, both sun gears 16 and 17 tend to turn forward with the torque transmitted to the sun gear 16 being subject to multiplication of the hydraulic torque converter so that the driven shaft will be driven forward at a higher speed and a lower torque than in the low range condition. As the load decreases and the speed increases, the reaction element 14 of the torque converter will turn forward over running the one-way brake 27 so that the torque is at a 1:1 ratio and the speed ratio approaches 1:1.

It will be noted that this shift can be accomplished very easily simply by disengaging the clutch 35 and engaging the clutch 24. The clutch 35 may be disengaged well ahead of engagement of the clutch 24 since when the clutch 35 is disengaged the sun gear 17 will continue to be held against reverse rotation by the one-way clutch 33 which will over run when the clutch 24 is engaged. In the shift, therefore, the clutch 24 is called upon to pick up only a portion of the load from the one-way clutch 33 so that the shift is accomplished smoothly and easily.

For reverse drive, the brake 25 is engaged and the clutch 35 is engaged. The brake 25 will hold the third sun gear against rotation and since it is the same size as the sun gear 16 and meshes with the same planet pinions 19 will have the effect of holding the sun gear 16 against rotation. This will stall the driven element 13 of the torque converter causing the liquid discharged therefrom to drive the reaction element 14 in a reverse direction. Reverse rotation of the reaction element 14 is transmitted through the one-way clutch 27 and the clutch 35 or one-way clutch 33 to the sun gear 17 to drive it in a reverse direction. With the sun gear 16 stationary, reverse rotation of the sun gear 17 will cause the planet carrier to travel around the sun gear 16 in a reverse direction thereby driving the driven shaft in reverse.

For engine braking during descending hills and the like, the brake 37 and clutch 35 may be engaged to hold the sun gear 17 against rotation. As the driven shaft turns forward due to momentum of the vehicle, the driven element 13 of the torque converter will be turned forward at an increased speed to provide a hydraulic braking effect in the torque converter. A still greater braking effect can be achieved by engaging the brake 25 and the clutch 24 to hold the sun gear 16 stationary and to connect the sun gear 17 directly to the driving shaft. The gear will act to multiply the speed between the driven shaft and the driving shaft so that the driving shaft tends to be rotated at a higher speed than the driven shaft to produce a very high braking effect.

When the vehicle is in neutral, it may be retained against accidental movement in a parked position by a pivoted locking pawl 45 engageable with a toothed disc 46 secured to the driven shaft 11. The pawl 45 tends normally to move into engagement with the disc and may be held out of engagement by means of a Bowden wire 47.

FIGURE 2 shows an alternative arrangement of the gearing for use when the transmission is to be mounted to drive a transverse driven axle. The operating parts of the transmission are the same as shown in FIGURE 1 and are indicated by the same reference numerals.

In this construction, the shaft 15 and the sleeve shaft 23 are elongated between the structure 29 and the gear set to leave a space therebetween. A transverse axle 48 extends through the transmission casing within the space above mentioned and carries an annular face gear 49 which is engaged by a conical pinion 51. The pinion 51 is secured to a sleeve shaft 52 rotatably surrounding the sleeve shaft 23 and connected to the planet carrier 18. In this construction, the drive is the same as described above in connection with FIGURE 1 except that in driving the output shaft 11 the transmission drives the sleeve shaft 52 and pinion 51 which in turn drives the transverse axle 48.

The transmission in either of the forms disclosed may be controlled by a control system, as shown in FIGURE 3. As shown, operating fluid under pressure, preferably a liquid such as oil, is supplied by a pump 53 driven by the gear 42, as shown in FIGURE 1. The intake of the pump 53 is connected to a sump 54 which may be the engine crank case or the transmission case to pump oil therefrom and to supply the oil under pressure through a pressure control valve 55 to the central port of a selector valve, indicated generally at 56. The selector valve, as shown, comprises an outer casing provided with ports 57, 58 and 59. The port 58 communicates with the conduits 38 and 36 so that when fluid under pressure is supplied therethrough the brake 37 and the clutch 35 will be engaged. Similarly, the port 59 communicates with the conduits 36 and 26 so that when fluid under pressure is supplied thereto the clutch 35 and the brake 25 will be engaged for reverse. The port 57 communicates through a conduit 61 with a valve, indicated generally at 62, to effect automatic shifting from the low range to the high range, as described hereinafter. The pressure control valve 55 returns excess liquid to a return line 63 leading to the sump and the return line also communicates with exhaust passages 64 and 65 in the rotor of the selector valve. The pressure supply passage from the pressure regulating valve 55 communicates with a supply passage 66 in the selector valve.

The selector valve may be controlled by a hand lever 67 movable over a quadrant 68 mounted adjacent to the operator and which is marked with "P," "N," "F," "L" and "R" positions corresponding respectively to park, neutral, forward, low and reverse. When the hand lever is moved either to the park or neutral position the passage 66 in the selector valve will be closed so that no liquid will be supplied to any of the clutches or brakes and they will all remain disengaged. In the park position, the pawl 45 is adapted to move into engagement with the disc 46 to hold the vehicle against movement. For this purpose a cam 69 is secured to the valve rotor and engages and rocks a bell crank lever 71 in a counterclockwise direction when the valve rotor is turned to the park position. The bell crank lever 71 is connected to the Bowden wire 47 to move it inward thereby to rock the pawl into engagement with the disc 46. When the cam 69 moves out of engagement with the bell crank lever, a spring 72 pulls on the Bowden wire and elevates the pawl 45 out of engagement with the disc 46.

When the selector valve rotor is turned to the low position, the passage 66 will communicate with the port 58 while the ports 57 and 59 are connected to the exhaust passages 64 and 65. At this time, operating fluid will be supplied to the brake 37 and clutch 35 to engage them for low speed operation, as described above. In the reverse position, the passage 66 will communicate with the port 59 to engage the clutch 35 and the brake 25 thereby to effect reverse drive, as described above. It will be noted that in the low position with the brake 37 and clutch 35 engaged engine braking for descending hills will be effected.

When the selector valve is turned to the forward position, the passage 66 will communicate with the port 57 and conduit 61. The conduit 61 terminates in a pair of spaced ports 73 in the casing of the valve 62 which is shown as a spool type valve. A spool is slidable in the casing having spaced lands 74 which control communication between the ports 73 and the conduits 36 and 39 and between the conduits 36 and 39 and exhaust ports 75 which return fluid to the sump 54.

For controlling the spool 74, it is provided with an elongated valve rod 76 which is normally urged to the left-hand position shown by a spring 77 resting at one end against a lever 78 and at its opposite end engaging a head 79 secured to the rod 76. The head 79 is connected through a freely rotatable bearing to a shiftable element 81 of a governor which is connected through links 82 to flyball arms 83. The flyball arms are carried by a rotatable shaft 84 which is preferably driven by the gear 44. Preferably a spring detent 85 tends to hold the valve spool 74 in either of its positions to which it is shifted so that the valve spool will move with a snap action without hunting or fluttering.

The lever 78 normally rests against an adjustable stop 86 and is connected to a rod 87 which is in turn connected through a spring 88 to the usual accelerator pedal. Preferably the rod 87 is also connected to a dashpot 89 to damp sudden movements thereof. With this construction, the position of the accelerator pedal becomes an indication of the load or torque when combined with the speed effect produced by the governor. By changing the loading of the governor spring in response to the accelerator pedal position, control of the valve 74 will be effected in response to a combination of speed and torque factors.

At low speeds, the valve 74 will be moved to the left, as shown by the spring 77, so that the conduit 61 communicates with the conduit 36 to engage the clutch 35. As the speed increases the governor will tend to shift the valve rod 76 to the right and when the force becomes sufficient to overcome the restraining effect of the detent 85, the valve spool 74 will move to its extreme right-hand position. In this position, the conduit 36 communicates with the valve port 75 and the conduit 39 communicates with the right-hand port 73 so that operating pressure is supplied to the clutch 24 to engage it. Thus by the simple shifting of a simple spool-type valve the shift from low range to high range operation is accomplished.

In some cases, it may be desirable to maintain certain of the clutches and brakes engaged when not subjected to fluid pressure and to supply them with fluid pressure to effect disengagement. For example, it may be desirable to engage the clutch 35 and the brake 37 to establish a driving connection between the drive and driven shafts when no pressure is being supplied by the pump 53 so that the automobile engine can be started by pushing the automobile. For this purpose, fluid pressure operating members, as shown in FIGURES 4 and 5, may be provided. As illustrated in FIGURE 4, the brake to be so engaged includes a brake band 91 split at one point and provided with spaced flanges 92. An operating rod 93 is secured to the lower flange and extends slidably through the upper flange to carry a piston 94 which is slidable in a cylinder 95. A spring 96 in the cylinder urges the piston upward to draw the ends of the brake band together and engage it while fluid pressure supplied to the upper side of the piston through a conduit 97 will move the piston downward against the spring to relieve the engaging pressure and to disengage the brake.

For operating a clutch in the manner described a disc clutch, as shown at 98 in FIGURE 5, may have an operating ring 99 connected to one or more pistons 101 slidable in cylinders 102. Springs 103 in the cylinders urge the pistons in a direction to engage the clutch and fluid pressure admitted to the opposite ends of the cylinders through conduits 104 will move the pistons against the springs to relieve the engaging pressure so that the clutches will be disengaged. It will be apparent that when normally engaged clutches and brakes, as shown in FIGURES 4 and 5, are employed the porting of the selector valve will be appropriately changed so that the operating cylinders for the clutches and brakes will be supplied with fluid when they are to be disengaged and will be vented when they are to be engaged.

An alternative arrangement for permitting engine starting by pushing of the vehicle is shown in FIGURE 6. In this construction, two pumps are provided one as shown at 105 being driven through the gear 42 by the driving shaft and the other, as shown at 106, being driven through the gear 44 by the driven shaft. Both pumps have their inlet sides connected to a sump 107, there being an outwardly opening check valve 108 between the sump and the inlet of the pump 105, as shown. The outlets of both pumps are connected to a discharge conduit 109 which may lead through a pressure regulating valve to the selector valve, there being an outwardly opening check valve 111 between the discharge of the pump 106 and the conduit 109. A bypass connection 112 is also provided between the outlet of pump 106 and the inlet of pump 107.

When the vehicle engine is started with the transmission in parked or neutral position the pump 105 will be driven to supply pressure to the conduit 109, the check valve 108 opening and the check valve 111 closing at this time. As the vehicle speed builds up the pump 106 will also be driven but will normally deliver fluid at a slightly lower pressure than the pump 105 so that the check valve 111 will remain closed. The discharge from pump 106 will flow through the bypass 112 to close the check valve 108 and will flow then to the inlet of the pump 105 so that under normal operating conditions the pumps operate in series to minimize the excess quantity of liquid circulated thereby. When the engine is not running and the vehicle is being pushed, the pump 106 will operate to supply liquid under pressure through the check valve 111, the check valve 108 closing at this time. Therefore, with the double pump system, as shown, not only is the excess quantity of liquid pumped reduced to a minimum, but also the various clutches and brakes may be operated by pushing the vehicle so that the engine can be started under these conditions.

While several embodiments of the invention have been shown and described herein, it will be understood that they are illustrative only and not to be taken as a definition of the scope of the invention, reference being had for this purpose to the appended claims.

What is claimed is:

1. A transmission comprising a hydraulic torque converter having a vaned driving element, a vaned driven element and a vaned reaction element, a differential gear set including a pair of sun gears, a gear carrier, pinions on the carrier meshing with one of the sun gears and idler pinions on the carrier meshing with the second sun gear and the first named pinions, means connecting the carrier to a load, means connecting said one sun gear to the driven element, a releasable clutch to connect the second sun gear to the driving element, a releasable mechanical brake, means to connect the second sun gear to the brake to hold the sun gear against rotation in at least one direction, means to connect the reaction element to the brake to hold it against reverse rotation, and releasable means to hold the first sun gear and the driven element against rotation whereby fluid will act on the reaction element to turn it in reverse.

2. The transmission of claim 1 in which the last named means comprises a third sun gear of the same diameter as said one sun gear and meshing with the first named pinions, and a releasable brake to hold the third sun gear against rotation.

3. A transmission comprising a hydraulic torque converter having a vaned driving element, a vaned driven element and a vaned reaction element, a differential gear set including a pair of sun gears, a gear carrier, pinions on the carrier meshing with one of the sun gears and idler pinions on the carrier meshing with the second sun gear and the first named pinions, means connecting the carrier to a load, means connecting said one sun gear to the driven element, a releasable clutch to connect the second sun gear to the driving element, a releasable mechanical brake, a one-way clutch connecting the second sun gear to the mechanical brake to hold the second sun gear against reverse rotation, a one-way clutch connecting the reaction element to the mechanical brake to hold the reaction element against reverse rotation, a releasable clutch acting through the last named one-way clutch to connect the reaction element to the second sun gear for reverse rotation, and means to hold the first sun gear and the driven element against rotation.

4. The transmission of claim 3 in which the last named means comprises a third sun gear of the same diameter as the first sun gear and meshing with the first named pinions, and a brake to hold the third sun gear against rotation.

5. A transmission comprising a hydraulic torque converter having a vaned driving element, a vaned driven element and a vaned reaction element, a differential gear set including three relatively rotatable members interconnected by gearing, means to connect one of said members to a load, means to connect a second of said members to the vaned driven element, means including a first releasable brake to hold a third of said members against rotation in a reverse direction, a first releasable clutch to connect said third member to the driving element, a one-way clutch connecting the reaction element to the first brake to hold the reaction element against reverse rotation, a second releasable clutch acting through said one-way clutch to connect the reaction element to said third member for reverse drive, a second releasable brake to hold the second of said members and the driven element against rotation, fluid pressure operating means for said brakes and clutches, a selector valve controlling connection of a source of fluid pressure to said brakes and clutches and having a low position in which the first brake and the second clutch are engaged, a reverse position in which the second brake and second clutch are engaged, and a drive position in which the first brake is engaged, a valve to connect a selector valve in its drive position to the first releasable clutch to engage it, and means responsive to the speed of a part of the transmission to control the last named valve.

6. The transmission of claim 5 in which the last named means is responsive to the speed of said one of the gear set members.

7. The transmission of claim 5 in which the source of fluid pressure comprises a first pump driven by the driving element and having its inlet connected through a check valve to a sump and its outlet connected to the selector valve, a second pump driven by said one of the members having its inlet connected to the sump and its outlet connected to the inlet of the first pump, and a connection including a check valve opening away from the second pump connecting the second pump outlet to the first pump outlet.

8. A transmission comprising a hydraulic torque converter having a vaned driving element, a vaned driven element and a vaned reaction element, a differential gear set including three relatively rotatable members interconnected by gearing, means to connect one of said members to a load, means to connect a second of said members to the vaned driven element, a reaction member, a brake to hold the reaction member against rotation, a releasable clutch to connect the reaction member to a third of said members to hold it against rotation to provide a reaction member for torque multiplication, a releasable clutch to connect said third member to the driving element for two-path hydraulic and mechanical drive when said first named clutch is released, a one-way clutch connecting the reaction element to the reaction member to hold the reaction element against reverse rotation, said first named releasable clutch and said one-way clutch connecting the reaction element to said third member, and means to hold the second member and driven element against rotation whereby fluid will act on the reaction element to drive it in a reverse direction.

References Cited in the file of this patent

UNITED STATES PATENTS

| | | |
|---|---|---|
| 2,549,090 | Hobbs | Apr. 17, 1951 |
| 2,578,450 | Pollard | Dec. 11, 1951 |
| 2,695,533 | Pollard | Nov. 30, 1954 |
| 2,711,656 | Smirl | June 28, 1955 |
| 2,736,412 | Livezey | Feb. 28, 1956 |
| 2,753,732 | Harrison | July 10, 1956 |
| 2,873,618 | De Lorean | Feb. 17, 1959 |
| 2,893,266 | Kelley | July 7, 1959 |
| 2,908,190 | Hause | Oct. 13, 1959 |
| 2,968,197 | De Lorean | Jan. 17, 1961 |